United States Patent [19]

Beurrier

[11] 4,061,049

[45] Dec. 6, 1977

[54] MECHANISM FOR CHANGING LINEAR MOTION TO SUBSTANTIALLY PIVOTAL MOTION

[75] Inventor: Henry Richard Beurrier, Chester Township, Morris County, N.J.

[73] Assignee: Bell Telephone Laboratories, Incorporated, Murray Hill, N.J.

[21] Appl. No.: 686,069

[22] Filed: May 13, 1976

[51] Int. Cl.² ............................................. F16H 1/14
[52] U.S. Cl. ............................... 74/424.8 R; 74/89.15
[58] Field of Search ......... 74/89.15, 424.8 R, 424.8 A

[56] References Cited

U.S. PATENT DOCUMENTS 3,568,957   3/1971   Wood .................................. 74/89.15

*Primary Examiner*—Samuel Feinberg
*Attorney, Agent, or Firm*—Charles Scott Phelan

[57] ABSTRACT

A length of bar stock is screw-threaded at two different thread pitches along respective fractions of its total length. Two bodies are internally threaded at the different pitches. Each body engages the bar stock along the portion of its length which is threaded at the corresponding pitch, and the bodies move along the bar at different rates of travel from one another in response to rotation of the bar. The bodies are mechanically attached by means of pivot connections to an elongated member, the two pivotal connection points defining an axis on the member. Rotation of the bar stock drives the pivotal connection points on the elongated member in substantially the same direction transverse to the axis, but at different speeds, with the result that substantially pivotal motion is generated about an unattached point on the axis of the elongated member, on the other side of the slower moving pivotal attachment point from the faster.

7 Claims, 3 Drawing Figures

MECHANISM FOR CHANGING LINEAR MOTION TO SUBSTANTIALLY PIVOTAL MOTION

BACKGROUND OF THE INVENTION

1. Field of the Invention

This invention relates to mechanical linkage arrangements for generating substantially pivotal motion about a point which is not pivotally attached.

2. Description of the Prior Art

Magnetic bubble wafers must be tested in the presence of two magnetic fields: a biasing magnetic field for creating the magnetic bubble domains in the wafer and a scanning magnetic field for moving the domains within the wafer. The wafer, therefore, is mounted on an elongated member and inserted in a narrow horizontal slit between two substantial magnet structures. Once the wafer is in position between the magnets immediately above and below it, the wafer is rotated in the horizontal plane so as to become aligned with the scanning magnetic field. The elongated member upon which the wafer is mounted protrudes from the magnet structures and is mounted on an assembly which permits the member to move in the horizontal plane in such a manner as to generate substantially pivotal motion in the horizontal plane about the point where the magnetic bubble wafer is mounted. Since there is insufficient space in the narrow confines between the magnet structures to provide a mechanical pivotal attachment at a point near the wafer, horizontal pivoting of the wafer must be accomplished by the application of forces upon the elongated member at points removed from the point where the wafer is located.

An obvious prior art method for generating pivotal motion about a point which is not secured to a pivot employs an elongated member extending radially from the point where the remote pivotal motion is desired. The member is mounted upon one or more arcuate tracks which are concentric about the remote point. Although this mechanism produces true pivotal motion about the remote point in the center of the curvature of the track, there exist substantial drawbacks which elevate its cost and complexity to a prohibitive level in applications where the arcuate track and the mounting means for the longitudinal member are situated an extended radial distance from the remote point. A costly lathe with a protracted radial arm is required to manufacture the track. Moreover, a precisely fitted roller-mounting arrangement is required to permit motion of the elongated member upon the track while maintaining tolerable radial alignment.

It is, therefore, an object of this invention to improve structures for generating substantially pivotal motion about an unaffixed point on the axis of a radial member.

It is another object of this invention to produce a simple and economical mechanism for generating precisely controllable angular motion about an unaffixed point.

SUMMARY OF THE INVENTION

An illustrative embodiment of this invention overcomes the above-mentioned shortcomings of the prior art by providing at least two mechanically correlated driving means for moving two points defining an axis of a member. The two driven points are each mechanically attached to their respective driving means, each driving means comprising an internally screw-threaded body mechanically engaged with and traveling along a threaded length of bar stock. Differential rates of travel between the internally threaded bodies are obtained by the use of dissimilar screw-threaded pitches. Alternatively, rack and pinion assemblies employing suitable gear ratios may be employed as driving means.

The driving means are mechanically correlated with one another so as to cause the driven points on the axis of the member to move at differential rates of travel. The rates of travel are such that a third point defined by the intersection of the axis while the member is in an initial position with the same axis while the member is in a displaced position experiences minimal lateral displacement as the member is angularly displaced. This third point need not be on the member itself, but may be a point in space where the above-described intersection of the axes takes place. The distances between the driven points and the remote point, and the lateral displacement distances traveled by the two drive points are mathematically interrelated by a simple trigonometric relationship. In essence, the quotient of the distance traveled by the slower driven point divided by the distance between the slower driven point and the remote pivot point equals the quotient of the distance traveled by the faster driven point divided by its distance from the remote pivot point.

It is a feature of this invention that there need not be full mechanical coupling between the driven points and the remote pivot point. Thus, the remote pivot may be but a point in space on the axis defined by the two driven points, and coupled to the driven points by an electromagnetic source mounted on the member.

BRIEF DESCRIPTION OF THE DRAWINGS

Comprehension of this invention is facilitated by reference to the following detailed description and its accompanying drawings in which.

DETAILED DESCRIPTION

Figure 1:
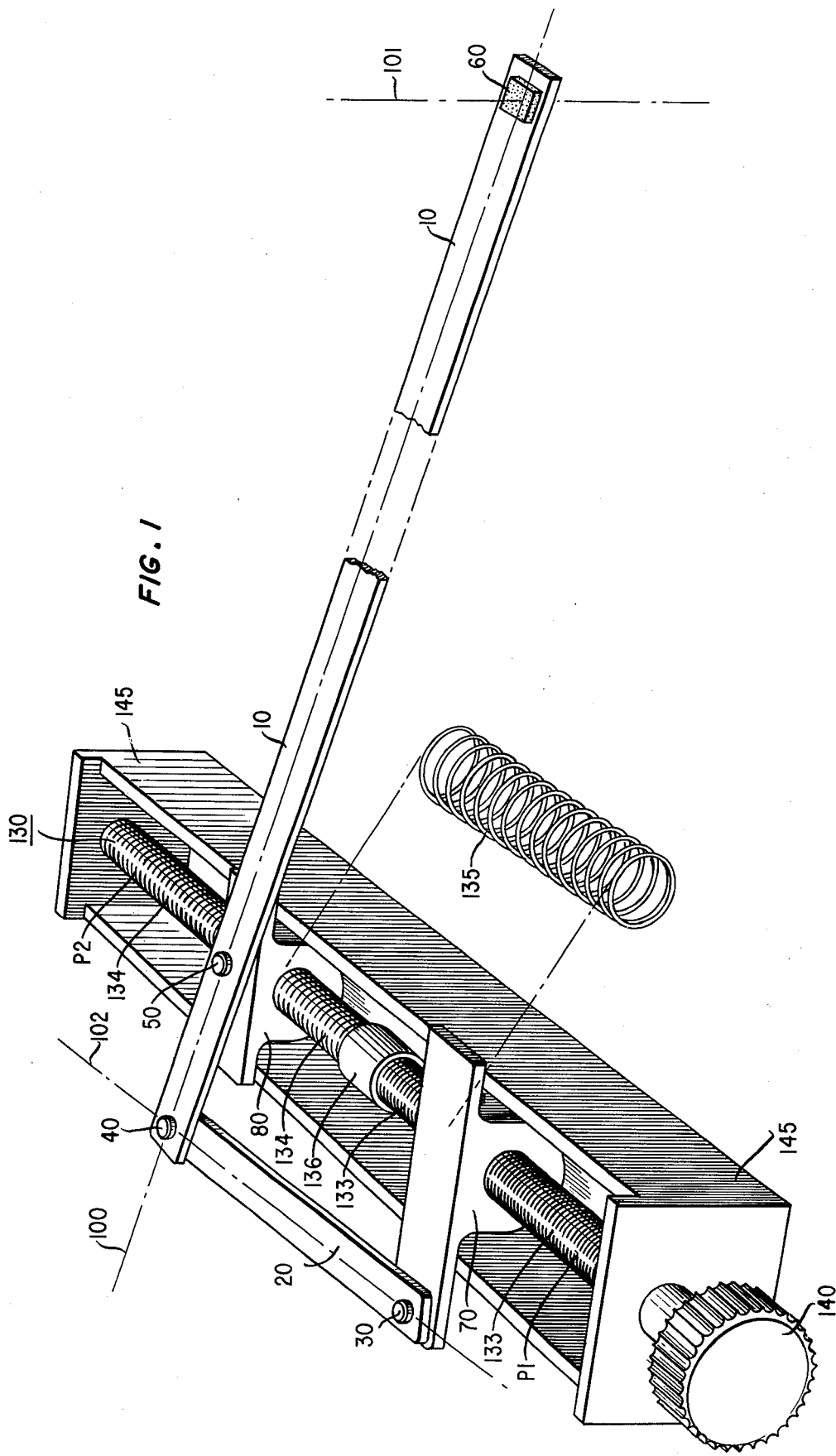
FIG. 1 is an illustrative embodiment of this invention employing a length of bar stock threaded at two different thread pitches along different portions of its length.

FIG. 1 depicts an illustrative embodiment of this invention employing a length of bar stock 130 which comprises two lengths of threaded bar stock 133 and 134 connected by a coupler 136, or alternatively, a single length of bar stock threaded at two thread pitches P1 and P2. Internally threaded body 70 is mechanically engaged with the bar stock where it is threaded at pitch P1, and internally threaded body 80 engages the bar stock where it is threaded at pitch P2. Elongated member 10 is pivotally attached to body 80 by means of pivot connection 50, and to body 70 by means of link 20 and pivots 30 and 40. Any form of pivotal attachment which securely attaches member 10 and link 20 to one another and to bodies 70 and 80 will suffice. Point 60, located at the intersection of horizontal axis 100 and vertical axis 101, is the point about which remote pivotal motion is desired, and a magnetic bubble wafer is shown mounted thereat for testing.

In practical embodiments of this invention where member 10 is displaced by relatively small pivotal angles, link 20 and its pivots 30 and 40 may be replaced by a semi-rigid length of spring-like material, such as sheet spring steel, which is permitted to flex at its ends, and reinforced for rigidity along its center portion to prevent buckling. The ends of the spring-like member are securely fastened to the respective butt ends of member 10 and body 70. Use of such a member simplifies construction of the apparatus and eliminates uncontrolled motion of member 10 due to pivot wear.

Application of a rotational force at knob 140 causes threaded bar 130 to rotate, with consequent motion therealong by bodies 70 and 80. The two bodies move in the same direction but at such different rates of travel that substantially pivotal motion is generated about point 60. In this embodiment, the fact that the respective lengths of threaded bar along which the bodies travel are axially coupled to one another correlates the relative rates of travel of the bodies for each turn of the threaded bar. Threaded bar 130 is spatially fixed by carriage assembly 145 which also guides bodies 70 and 80 as they move along the length of the threaded bar. The bodies may be preloaded against one another by a spring 135 which is held in compression around threaded bar 130 between the bodies, thereby providing an economical way to prevent uncontrolled motion of the bodies due to imprecise construction or thread wear.

Pivots 30 and 40 connect link 20 to body 70 and member 10, respectively. These pivots define axis 102 of link member 20 which, in this embodiment, is substantially parallel to the longitudinal axis of threaded bar 130. In this embodiment, body 70 moves at a faster rate, in response to rotation of knob 140, than body 80 to which member 10 is directly pivotally connected. However, other embodiments of this concept may provide for attachment of member 10 directly to the faster moving body and employ the link to connect the member to the slower moving body. Such a modification of the embodiment would require that the link be located on the opposite side of the threaded bar 130 from that shown in FIG. 1, and would provide the space-saving advantage of situating the linkage on only one side of the carriage 145. Irrespective of whether the link couples member 10 to the faster or the slower body, the trigonometric relationship which governs the distances between points 40, 50, and 60 on axis 100 and the distances traveled by points 40 and 50 when bar 130 is rotated will be similar and is illustrated in FIG. 2.

Figure 2:
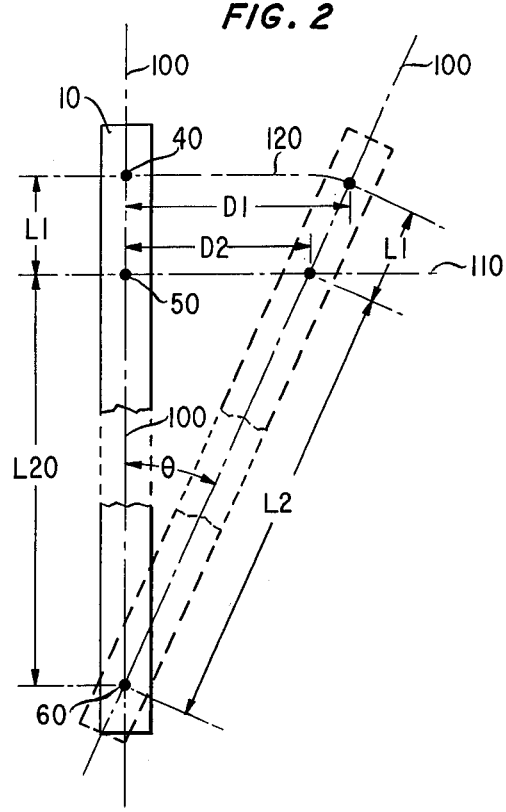
FIG. 2 is an illustration useful for explaining the trigonometric relationship which controls the dimensions of an illustrative embodiment.

FIG. 2 graphically illustrates the simple trigonometric concept to which the motion of member 10 in FIG. 1 conforms so as to generate substantially pivotal motion about point 60. Member 10 is shown in its initial position by the solid line figure, and in a displaced position by the broken-line figure. The distance between driven points 40 and 50 on axis 100 is identified as L1 in the illustration, and the distance between driven point 50 and remote pivot point 60 is identified as L20 while member 10 is in its initial position, and as L2 while member 10 is in a displaced position. Point 60 is defined as the point where axis 100 of member 10 in the initial position (solid figure) intersects itself when member 10 is angularly displaced (dashed figure). As such, therefore, point 60 does not bear a fixed distance relationship with points 40 and 50, except insofar as it is on the same axis, and neither does point 60 retain a fixed distance perpendicular to axis 110. Point 60 may be conceptualized as the point on axis 100 which undergoes the minimum lateral displacement as member 10 is angularly displaced. This displacement error, however, is inconsequential for small angles of displacement of member 10 as is typically the case when positioning magnetic bubble wafers in magnetic fields.

In this illustrative embodiment, point 50 is pivotally affixed to its driving means and constrained to linear motion along axis 110 and pivotal motion about itself. Point 40 is mechanically connected to its driving means and constrained to lateral motion along curve 120 and pivotal motion about itself. Upon application of the driving forces at points 40 and 50, point 40 travels along curve 120 for an effective lineal distance D1, and point 50 travels along axis 110 for a distance D2. Application of a fundamental trigonometric principle which proportionately equates the analogous sides of similar triangles yields:

$$(L1 + L2)/(D1) = (L2/D2) \tag{1}$$

and algebraic reduction thereof yields:

$$(L1/L2) + 1 = (D1/D2). \tag{2}$$

This expression signifies the relationship between the distances shown in FIG. 2 which must be satisfied in order to attain substantially pivotal motion about remote point 60 when threaded bar 130 in FIG. 1 is rotated. Persons skilled in the art can easily calculate the combinations of thread pitches and distances required to satisfy expression (2).

Figure 3:
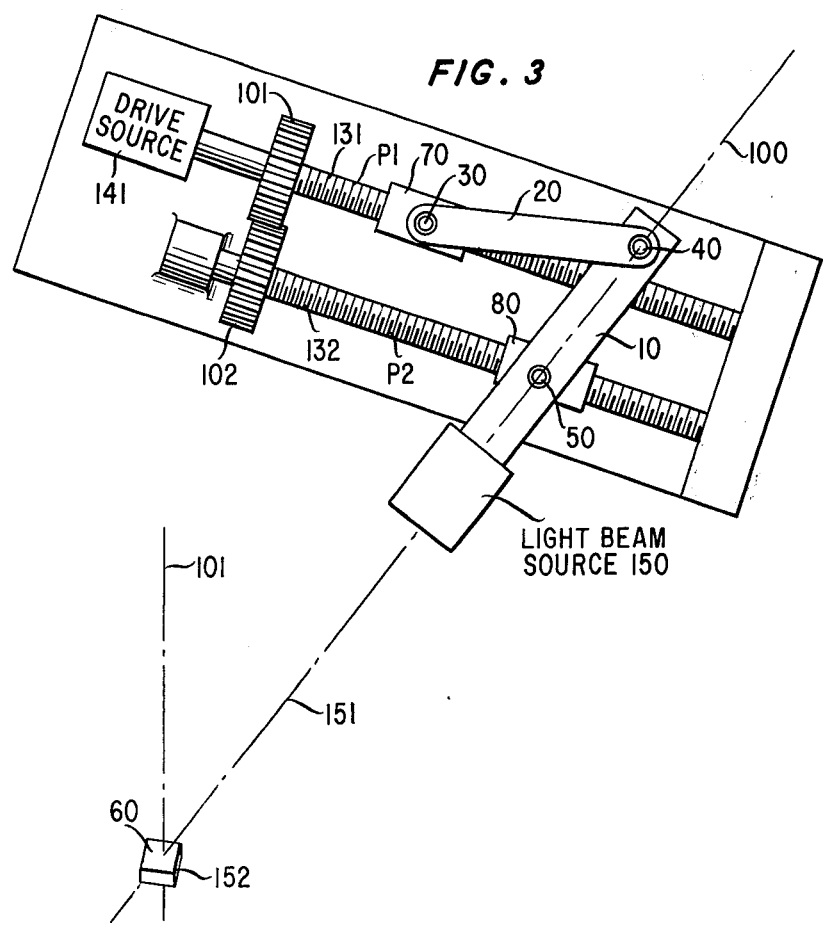
FIG. 3 illustrates an embodiment of this invention employing two lengths of bar stock mechanically connected to one another by meshed gears and shows electromagnetic coupling between the driven and remote points.

FIG. 3 illustrates the essential elements of an embodiment of this invention employing two threaded shafts 131 and 132. Each shaft is mechanically connected to an associated one of meshed gears 101 and 102. Pivot points 40 and 50 on an axis of member 10 travel at differential rates of travel, as was discussed in regard to the embodiment of FIG. 1, so as to generate substantially pivotal motion about point 60. Proper rates of travel for driven points 40 and 50 when drive source 141 is activated are attained by any appropriate combination of the gear ratio between gears 101 and 102, and thread pitches P1 and P2 of bars 131 and 132, respectively. The selection of a proper gear ratio and the directions and values of the thread pitches is easily determined by persons skilled in the art. Proper selection of these parameters will correlate the rate of travel of bodies 70 and 80. Drive source 141 comprises any person or apparatus capable of exerting a controlled rotational force.

FIG. 3 further shows that full mechanical coupling is not required between the driven points and the remote point. Light beam source 150 is shown mounted on member 10 which has been shortened in this embodiment and does not extend to the remote point 60. A specimen target 152 is situated at point 60 which is but a point in space at the intersection of axis 100 and vertical axis 101. A beam of light 151 couples the light beam source 150 to the target 152.

In both embodiments of this invention discussed above and shown in FIGS. 1 and 3, elongated member 10 is supported only at pivot points 40 and 50. The pivots hold the member in the horizontal plane so long as the bodies are kept from rotating by a support such as carriage 145 in FIG. 1.

In one embodiment of this invention which has been constructed as per FIG. 1 and successfully applied to the problem of aligning magnetic bubble wafers with a scanning magnetic field, bar stock of standard number 10 gauge diameter with standard screw thread pitches of 32 and 24 threads per inch, respectively, was employed. A magnetic bubble wafer was placed on point 60 of the elongated member with a distance of approximately 12.5 inches between point 60 and pivot 50, and approximately 4.17 inches between pivots 40 and 50. A scanning arc of 4.3° was attained, incurring a maximum of only 0.009 inches of displacement error at the remote point 60. Point 50 was limited to travel only 0.94 inches along bar 130, but greater scanning arc range can be achieved if longer travel is permitted along bar 130.

It should be remembered that, although the inventive concept disclosed in this application is presented within the context of specific embodiments and applications, these are merely illustrative and persons skilled in the art can generate additional embodiments for applications not mentioned herein without exceeding the scope of this invention.

What is claimed is:

1. An apparatus for generating substantially pivotal motion of an axis of a member about a remote point on the axis, comprising
    means for driving a first point on the axis of the member along a straight path throughout the extent of its travel and a second point along a curved path, which paths are transverse to the axis, and
    means in the driving means for correlating the motion of the driven points so as to drive the points in substantially the same direction at such differential rates of travel that the remote point on the axis, on the other side of the slower driven point from the faster, experiences minimal lateral displacement as the driven points are displaced from an initial position.

2. An apparatus in accordance with claim 1 in which the driving means comprises
    first and second lengths of bar stock,
    first and second internally threaded bodies for engaging the first and second lengths of bar stock respectively, and moving therealong in response to the rotational motion of each length of bar stock,
    means for mechanically connecting the bodies respectively to the first and second points on the axis of the member, and
    means for mechanically coupling the bar stock to the correlating means.

3. An apparatus in accordance with claim 2 in which
    the first length of bar stock and the body engaged therewith are threaded in the same thread direction but at a different thread pitch from that at which the second length of bar stock and its respectively engaged body are threaded, and
    the correlating means comprises the mechanical connection between the first and second lengths of threaded bar stock to form a single length of bar stock threaded at two thread pitches, thereby constraining the first and second lengths of bar stock to rotate in the same direction at equal rates of rotation.

4. An apparatus in accordance with claim 1 in which the member is mechanically coupled to the remote point.

5. An apparatus in accordance with claim 1 wherein a specimen is situated at the remote point which is located outside the body of the member and means are provided in the member for projecting radiant energy in the direction of the axis of the member to irradiate different faces of the specimen as the points are driven.

6. An apparatus for generating substantially pivotal motion of an axis of a member about a remote point on the axis, the apparatus being of the type where two points on the axis are driven along respective paths transverse to the axis at such differential rates of travel that the remote point on the other side of the slower driven point from the faster experiences minimal spatial displacement as the driven points are displaced, comprising
    first and second lengths of threaded bar stock,
    first and second internally threaded bodies for engaging the first and second lengths of bar stock respectively, and moving therealong in response to the rotational motion of each length of bar stock,
    means for mechanically connecting the bodies respectively to the first and second points on the axis of the member, and
    first and second engaged gears mechanically affixed to the respective first and second lengths of threaded bar stock so that rotation of the gears causes both lengths of bar stock to rotate, thereby moving the bodies at the differential rates of travel.

7. An apparatus for generating substantially pivotal motion of an axis of a member about a remote point on the axis, the apparatus being of the type where two points on the axis are driven along respective paths transverse to the axis at such differential rates of travel that the remote point located on the other side of the slower driven point from the faster experiences minimal spatial displacement as the driven points are displaced, comprising
    a length of bar stock threaded at first and second thread pitches along different portions of its length, and
    first and second bodies, each mechanically connected to the member at different ones of the two points and respectively threaded internally at the first and second thread pitches for engaging the bar stock along the correspondingly threaded portions of its length so as to move therealong, in response to rotational motion of the bar stock, at the differential rates of travel.

* * * * *